(No Model.)
F. E. GOLDSMITH.
THILL COUPLING.
No. 273,064. Patented Feb. 27, 1883.
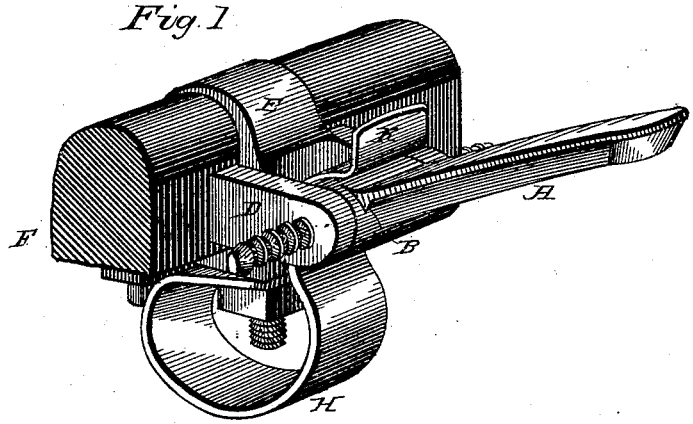
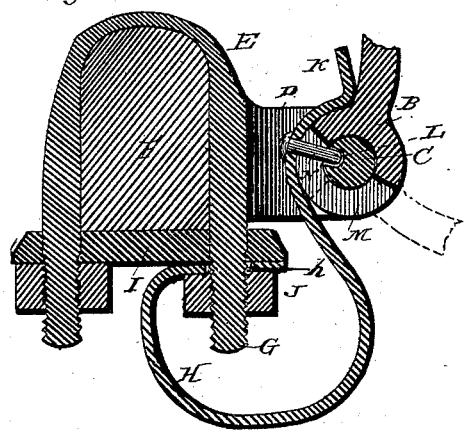
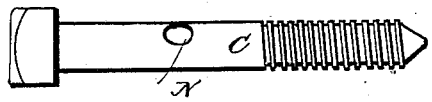
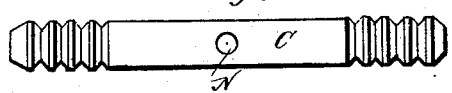
WITNESSES:
Fred. G. Dieterich
J. G. Hinkel
Frederick E. Goldsmith,
INVENTOR,
By Louis Bagger & Co.
ATTORNEYS.

UNITED STATES PATENT OFFICE.

FREDERICK E. GOLDSMITH, OF JACKSONBOROUGH, OHIO.

THILL-COUPLING.

SPECIFICATION forming part of Letters Patent No. 273,064, dated February 27, 1883.

Application filed December 23, 1882. (No model.)

*To all whom it may concern:*

Be it known that I, FREDERICK E. GOLDSMITH, of Jacksonborough, in the county of Butler and State of Ohio, have invented certain new and useful Improvements in Thill-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved thill-coupling. Fig. 2 is a longitudinal vertical section through the same, and Figs. 3 and 4 are detail views.

Similar letters of reference indicate corresponding parts in all the figures.

My invention has relation to thill-couplings; and it consists in the improved construction and combination of parts of the same, as hereinafter more fully described and claimed.

In the accompanying drawings, the letter A indicates the thill-iron, the inner end of which forms a slotted eye, B, through which the bolt C passes, which rests in bearings D, which may be made in one with the clip E, or may be fastened to it. The clip E is of the usual construction, and is fastened around the axle-tree F. One of the screw-threaded ends, G, of the clip passes through an eye, $h$, in the end of a curved spring, H, which is held fast between the shackle I and a nut, J. The other end of the spring H passes in front of the axle and in between the bearings D, resting and bearing against the inner end of the slotted eye B. Right above the part bearing against the eye B the spring is turned up, forming a lip, K, by which the spring is pressed back when the thill-iron is raised. A stud, L, projects from the concave part of the end of spring H into the slot M in the eye B, and into a hole, N, bored in the bolt C. This stud holds the bolt fast without nuts, and the spring prevents rattling of the thills, while it holds the bolt in place.

Any common thill-coupling may be changed to use my device by cutting a slot in the eye, drilling a hole in the bolt, and inserting the spring.

When it is desired to remove the shafts, the shafts are raised so that the thill-iron presses lip K back, which draws the stud L out of the hole in the bolt, when the bolt may be removed and the shafts taken off. When it again is desired to put the shafts on, the eye is pressed against the spring, the bolt inserted and turned till the stud L snaps into the hole in the bolt.

Having thus described my invention, I claim and desire to secure by Letters Patent of the United States—

1. In a thill-coupling, the combination of the bolt C, having the hole N, with the curved spring H, having stud L, projecting through the slotted eye B into the hole N, holding the bolt fast, substantially as and for the purpose shown and set forth.

2. In a thill-coupling, the thill-iron A, having slotted eye B, bearings D, bolt C, having hole N, spring H, having eye $h$, lip K, and stud L, clip E, having nuts J, and axle-tree F, all constructed and combined to operate substantially as shown and set forth.

In testimony that I claim the foregoing as my own I have hereunto affixed my signature in presence of two witnesses.

FREDERICK E. GOLDSMITH.

Witnesses:
CHARLES E. BICKMORE,
DAVID FLENNER.